May 19, 1959 C. C. RAYBURN ET AL 2,887,622

ELECTRICAL CIRCUIT PATTERN TESTER

Filed Aug. 7, 1953

INVENTORS
CHARLES C. RAYBURN
ROBERT L. HENRY

BY [signature] Walter S. Paul
ATTORNEYS

United States Patent Office 2,887,622

Patented May 19, 1959

2,887,622

ELECTRICAL CIRCUIT PATTERN TESTER

Charles C. Rayburn, Falls Church, Va., and Robert L. Henry, Silver Spring, Md., assignors to the United States of America as represented by the Secretary of the Navy Application August 7, 1953, Serial No. 373,076

6 Claims. (Cl. 317—123)

(Granted under Title 35, U.S. Code (1952), sec. 266)

This invention relates to electrical test apparatus and particularly to an apparatus whose circuit is arranged to test continuity of electrical or electronic circuitry.

With the advent of new techniques for obtaining printed circuits and the like, mass production of electronic equipment has been stimulated to the point where automatic mechanical mass producing of electronic equipment is possible. This means that ancillary testing apparatus must be developed to fit in with the new ideas and devices that are being made. For example, if an entirely automatic or greatly automatic system were arrived at for mass producing FM radios or radar gear the system would be no faster than the testing of the various printed circuits, usually on an electrically insulated base, could be accomplished. Accordingly, an object of this invention is to provide an apparatus for testing circuit continuity of a selected one of a very large variety of possible circuits on an insulating base.

Since the circuit pattern to be tested may vary considerably a satisfactory test apparatus must be versatile enough to make the necessary diversified tests of continuity. A further object of the invention is to provide an electrical circuit arrangement in the test apparatus capable of rapid selection of pattern test, preferably by mere insertion of a programming card between switch contacts, making and breaking portions of a circuit corresponding to the particular test to be made.

Another object of the invention is to provide a circuit in a test apparatus as described previously, the circuit including a number of normally closed series connected switches in a signal and work circuit, one of which is opened by suitable programming means, as a card properly punched, each of the series connected switches having a bypass line connected with the contacts of a relay, the relays being connected with a source of current independent of that of the series connected switches, and the relays accepting as a part of their circuit that pattern which is to be tested, whereby when the pattern is capable of conducting current, the relay associated with the bypass of the opened series switch bypasses that switch to energize the series circuit for signaling, operating other relays or operating the mechanism which controls the admission and flow of pattern containing members to be tested.

Other objects and features will become apparent in following the description of the illustrated form of the invention.

Figure 1:
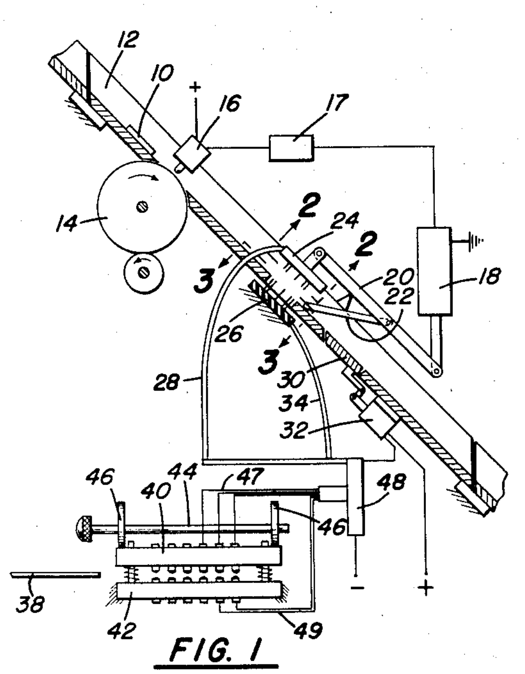
Fig. 1 is a schematic view showing the flow path of members whose circuit patterns are being tested.

In Fig. 1 there is a schematic representation of a structural organization wherein articles, as members 10, supporting electrical circuit patterns may have their patterns tested for continuity. It is not necessary that the patterns be printed on the insulating base members 10, the patterns may be applied in any known way. Moreover, only one channel 12 is illustrated for convenience, it being understood that channel 12 together with all of its associated structure and wiring may be duplicated any number of times in the same test apparatus, depending on the quantity of tests demanded for a given time.

Figure 4:
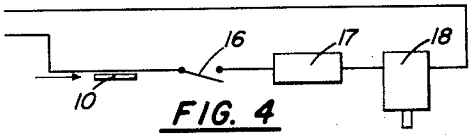
Fig. 4 is a schematic simplified wiring diagram of the mechanical control apparatus in Fig. 1.
Figure 5:
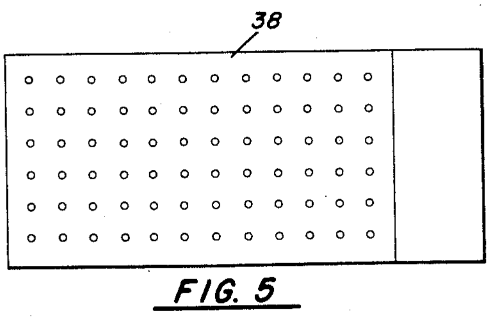
Fig. 5 is a plan view of a programming card suggested as a preferred programming device.

Members 10 are gravity or otherwise fed into channel 12 and upon reaching the motor driven roller 14, they are urged against the plunger of switch 16 by roller 14, closing switch 16 (see Fig. 4) thereby closing a circuit containing time delay relay 17 and solenoid 18, the latter operating lever 20 and link 22. Both lever 20 and link 22 are schematic representations of known linkage systems and mechanical devices, however, the simple link and lever may be used to serve the following purposes. As the electrical pattern supporting member 10 slides down channel 12 switch 16 is closed by it, causing the solenoid 18 to be energized when the time delay 17 permits. Meanwhile the member 10 slides down channel 12 to a test position, that is, between heads 24 and 26, being stopped at that point by contacting link 22. Then, solenoid 18 actuation withdraws link 22 and moves head 24 toward head 26, the probes on the heads contacting the patterns on one or both surfaces of member 10, and also along the edges thereof. At this instant the circuit pattern on the article 10 is tested for continuity by means described subsequently, and if the circuit pattern is continuous, the reject door 30 in the bottom of channel 12 is closed allowing the article or member 10 to slide through channel 12. Reject door 30 is merely a pivoted trap door, normally open, and closed by a linkage actuated by solenoid 32, the latter being energized only if the pattern being tested will conduct a test charge.

Any number of probes may be used in heads 24 and 26, for illustrative purposes, head 24 having seventeen probes, as those indicated at P1, P2, P3, P4, P5 and P6, and head 26 having five probes, as those indicated at P7 and P8. The twelve illustrated peripheral probes, three of which are indicated at P1, P2 and P3, are adapted to engage the sides of member 10 or notches in the sides of member 10, and the outer ends thereof are adapted to seat in recesses 36 provided in head 26 when the heads are in test position. There being twenty-two probes in all, it is apparent that a vast number of different patterns on members 10 may be tested by using any two or more probes. More explicity, all of the probes come into contact with the article 10, but only two or more (usually far less than the entire twenty-two) probes touch the circuit on the member 10.

In use of the apparatus, the circuit pattern on member 10 will be known, by inspection, and holes will be punched in card 38 to set the test apparatus for a test peculiar to the circuit pattern on article 10. After card 38 is punched it is inserted between plates 40 and 42, each containing a number of spring loaded switch contacts, pairs of which form switches. The contacts in the plates 40 and 42 are connected to the respective heads, 24 and 26, by the cables 28, 34 and 48 and the leads 47 and 49 as shown in Fig. 1. Plates 40 and 42 are spring biased away from each other so that the card 38 may be easily inserted and then the plate 40 moved toward plate 42 by rotating cam shaft 44 whose cams 46 force plate 40 toward plate 42 and hold it there. Although card 38 is shown as a preferred programming device, others may be used, such as a series of manually operated push button switches, in that the function of card 38 is to separate preselected ones of the spring loaded contacts of the upper plate from those of the lower plate, except at those stations where the card is punched.

Figure 6:
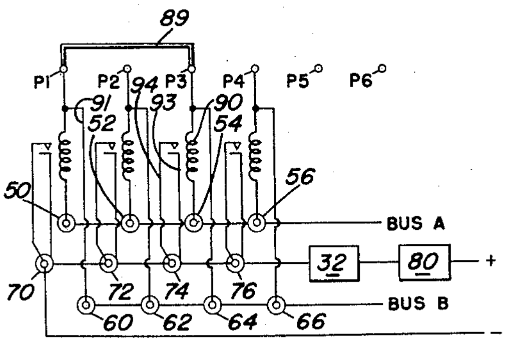
Fig. 6 is a schematic partial wiring diagram of the main circuits of the test apparatus.

Now, attention is invited primarily to Fig. 6 and the circuit that makes possible the testing of a large number of different circuit patterns on articles 10 by mere insertion of card 38 between the first group of contacts carried by plate 40 and the second group of contacts carried by plate 42. The first contacts are in alignment with the second contacts and a pair thus considered, acts as a switch to be opened by insertion of card 38 and closed by inserting the same card with a hole in it at the point of engagement of the contacts. In Fig. 6 a pair of the concentric circles, as 50, represents a switch formed by a pair of contacts, that is, one on plate 40 and the corresponding, opposed one on plate 42.

The switches of Fig. 6 may be considered as being in three sets, a first set including switches 50, 52, 54, 56 and others merely duplicating those shown, a second set including switches 60, 62, 64, 66 and others duplicating those shown, and a third set 70, 72, 74, 76 and others unshown, the latter switches being connected in series and being in a circuit separate from the switches of the first and second sets. Thus, a circuit is formed by all of the series connected switches, the solenoid 32 and other signal, counting and/or warning devices 80, together with a suitable source of A.C. or D.C. power. The entire circuit having the series connected switches is not directly connected to any of the probes of heads 24 and 26 but is influenced thereby in the following manner.

Figure 2:
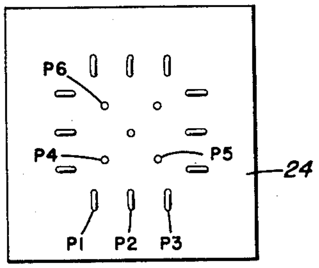
Fig. 2 is an enlarged view of one of the test heads taken substantially on the line 2—2 of Fig. 1.
Figure 3:
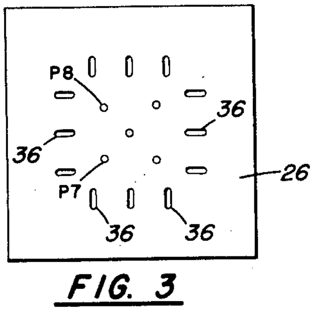
Fig. 3 is an enlarged view of the other test head and taken on the line 3—3 of Fig. 1.

Probes P1 through P4 are shown with their circuitry to indicate the principles of operation, it being understood that the other eighteen probes shown in Figs. 2 and 3 would merely duplicate that which is shown for probes P1 through P4. A test of the pattern 89 on article 10 is to be made and this pattern is contacted by probes P1 and P3, both of head 24. To prepare the apparatus for testing such a pattern, card 38 will have holes punched in positions corresponding to switches 54 and 60, and would have all of the series connected switch positions punched out except switch 74. Follow the results of such programming in Fig. 6. The switches connected to bus A are all open except 54 and the switches connected to bus B are all open except 60 whereby current may flow only from bus A to one side of the coil of relay 90, through that coil to probe P3, through pattern 89, probe P1 and line 91 to switch 60, and bus B. Where D.C. is used, the result is the same. Now, the coil of relay 90 is energized, but only because pattern 89 can conduct, that is, it is continuous and unbroken. Since the pattern 89 is good, the article 10 must be saved by having the trap door 30 close, and this can be done by completing the series connected switch circuit. However, all the switches, except switch 74 of this circuit are already closed by the aforementioned holes in card 38, and the only switch to be actuated is switch 74. This is done by a substitute for switch 74, that is, it is bypassed by wires 93 and 94 which are connected with the contacts of relay 90 and both sides of switch 74.

While the relay 90 and its contacts with their wires 93 and 94 has been set forth in some detail, it is seen in Fig. 6 that each of the switches connected to bus bar A has a relay similarly integrated in the circuit. The operation of the invention is now quite apparent. It is understood that various modifications may be made without departing from the following claims.

The invention described herein may be manufactured and used by or for the Government of the United States of America for governmental purposes without the payment of any royalties thereon or therefor.

What is claimed is:

1. In an electrical test apparatus for testing a circuit pattern, head means having a plurality of probes and adapted to coact with a circuit pattern, a plurality of switches to connect said probes with a source of current, a pre-punched card corresponding to a circuit pattern to be tested for selectively actuating some of said switches to establish a testing circuit, a normally open circuit including a separate source of current and electroresponsive means, relay means responsive to a current flow in said testing circuit including said circuit pattern for closing said normally open circuit and causing said electroresponsive means to be actuated.

2. In an electrical test apparatus for testing a circuit pattern; head means having a plurality of probes and adapted to coact with a circuit pattern; a plurality of switches to connect said probes with a source of current; a pre-punched card corresponding to a circuit pattern to be tested for selectively actuating some of said switches to establish a testing circuit; a series connected circuit including a plurality of series connected switches, a separate source of current and electroresponsive means; one of said series connected switches being in an open position and the other of said series connected switches being in a closed position; means including a relay for shorting said open switch in response to current flowing in said testing circuit including the circuit pattern to cause said electroresponsive means to be actuated.

3. In an electrical test apparatus for testing a circuit pattern; head means having a plurality of probes and adapted to coact with a circuit pattern; a plurality of switches to connect said probes with a source of current; a pre-punched card corresponding to a circuit pattern to be tested for selectively actuating some of said switches to establish a testing circuit; a series connected circuit including a plurality of series connected switches, a separate source of current and electroresponsive means; at least one of said series connected switches being in an open position and the other of said series connected switches being in a closed position; a relay series connected in said testing circuit, said relay having a pair of normally open contacts electrically connected across said open positioned switch, whereby when current flows in said testing circuit including the circuit pattern said normally open contacts are closed to complete said series circuit and to thereby actuate said electroresponsive means.

4. In an electrical test apparatus for testing a circuit pattern; head means having a plurality of probes and adapted to coact with a circuit pattern; means for connecting said probes with a source of current; said connecting means comprising first and second oppositely disposed support means each containing a plurality of switch contacts, means connecting the switch contacts of said first support means to said probes and means for connecting the switch contacts of said second support means to a power source, the contacts of said first support means extending towards and normally contacting the contacts of said second support means to thereby form a plurality of switches, a pre-punched card corresponding to a circuit pattern to be tested operatively positioned between said first and second support means so that selected switches are held open; a series connected circuit including a plurality of series connected switches, a separate source of current and electro-responsive means; at least one of said series connected switches being in an open position and the other of said series connected switches being in a closed position; said means connecting the switch contacts of said first support means including a relay for shorting said open switch in response to current flowing in said connecting means, the probes and said circuit pattern to cause said electroresponsive means to be actuated.

5. In an electrical test apparatus for testing a circuit pattern; head means having a plurality of probes and adapted to coact with a circuit pattern; means for connecting said probes with a source of current; said connecting means comprising first and second oppositely disposed support means each containing a plurality of switch contacts, the contacts of said first support means extending towards and normally contacting the contacts of said second support means to thereby form a plurality of switches; a pre-punched card corresponding to a circuit to be tested operatively positioned between said first and second support means so that selected switches are held open; said switches being divided into at least two sets, the contacts of the first set on the second support means being connected to one side of said current source, the contacts of the second set on the second support means being connected to the other side of said current source, the contacts of the first set on the first support means each being connected to one side of a separate relay coil, respectively, the other side of each of said relay coils being connected to one of said probes, respectively, and also to one of the contacts of the second set on said first support means, respectively, said relay coils each having contacts associated with them; a normally open circuit including a separate source of current, electroresponsive means and contacts of one of said relays, whereby upon current flow through the coil of one of said relays, the probes and the circuit pattern, said normally open circuit will close causing said electroresponsive means to be actuated.

6. In an electrical test apparatus for testing a circuit pattern; head means having a plurality of probes and adapted to coact with a circuit pattern; means for connecting said probes with a source of current; said connecting means comprising first and second oppositely disposed support means each containing a plurality of switch contacts, the contacts of said first support means extending towards and normally connecting the contacts of said second support means to thereby form a plurality of switches; said switches being divided into three sets, the contacts of the first set on the second support means being series connected to one side of a power source, the contacts of the second set on the second support means being series connected to the other side of said power source, the contacts of the first set on the first support means each being connected to one side of a separate relay coil, respectively, the other side of each of said relay coils being connected to one of said probes, respectively, and also to one of the contacts of the second set on said first support means, respectively, said relay coils each having contacts associated with them; a pre-punched card corresponding to a circuit to be tested operatively positioned between said first and second support means so that selected switches are held open; a series connected circuit including the third set of switches in series, each switch having a relay coil and its contacts associated with it, a separate source of current and electroresponsive means; at least one of said series switches being in an open position and the remainder of said series connected switches being in a closed position; means connected to the contacts of the relay and to the contacts of the associated open switch for shorting said open switch in response to current flowing in said relay coil and the circuit pattern to cause said electroresponsive means to be actuated.

References Cited in the file of this patent

UNITED STATES PATENTS

| | | |
|---|---|---|
| 1,449,078 | Whittlesey | Mar. 20, 1923 |
| 1,667,420 | Kent | Apr. 24, 1928 |
| 1,851,514 | Horton | Mar. 29, 1932 |
| 2,101,381 | Appleyard | Dec. 7, 1937 |
| 2,158,630 | Lloyd | May 16, 1939 |
| 2,198,503 | Morrison | Apr. 23, 1940 |
| 2,329,491 | Sulzer | Sept. 14, 1943 |
| 2,609,927 | Welchel | Sept. 9, 1952 |
| 2,663,844 | Earle et al. | Dec. 22, 1953 |
| 2,844,250 | Bayha et al. | July 22, 1958 |